United States Patent
Hradecky et al.

(10) Patent No.: US 11,499,414 B2
(45) Date of Patent: Nov. 15, 2022

(54) AUTOMATED PUMP-DOWN

(71) Applicant: Impact Selector International, LLC, Heath, TX (US)

(72) Inventors: Jason Allen Hradecky, Heath, TX (US); James Patrick Massey, Breckenridge, CO (US); Travis Hubbard, Houston, TX (US)

(73) Assignee: Impact Selector International, LLC, Heath, TX (US)

( * ) Notice: Subject to any disclaimer, the term of this patent is extended or adjusted under 35 U.S.C. 154(b) by 0 days.

(21) Appl. No.: 16/797,701

(22) Filed: Feb. 21, 2020

(65) Prior Publication Data
US 2020/0270979 A1 Aug. 27, 2020

Related U.S. Application Data

(60) Provisional application No. 62/809,962, filed on Feb. 25, 2019.

(51) Int. Cl.
*E21B 47/008* (2012.01)
*E21B 47/10* (2012.01)
*E21B 47/12* (2012.01)
*G05B 15/02* (2006.01)

(52) U.S. Cl.
CPC ............ *E21B 47/008* (2020.05); *E21B 47/10* (2013.01); *E21B 47/12* (2013.01); *G05B 15/02* (2013.01)

(58) Field of Classification Search
CPC ........ E21B 47/008; E21B 47/10; E21B 47/12; E21B 43/2607; E21B 31/035; E21B 2200/20; E21B 23/08; E21B 23/14; G05B 15/02
See application file for complete search history.

(56) References Cited

U.S. PATENT DOCUMENTS 5,351,531 A * 10/1994 Kerr ................. E21B 47/04 33/720
9,657,540 B2 5/2017 Coles et al.
2002/0198661 A1* 12/2002 Strickland ............ E21B 47/04 702/6

(Continued)

FOREIGN PATENT DOCUMENTS

WO 2012021126 A1 2/2012
WO 2014014441 A1 1/2014

(Continued)

OTHER PUBLICATIONS

PCT/US2020/019270 Written Opinion and International Search Report dated Aug. 7, 2020, 11 pages.

*Primary Examiner* — Tarun Sinha
*Assistant Examiner* — Yossef Korang-Beheshti
(74) *Attorney, Agent, or Firm* — Boisbrun Hofman, PLLC

(57) ABSTRACT

An apparatus and method for performing automated pump-down operations. An apparatus may include a control system configured to be communicatively connected with a fluid pump disposed at a wellsite surface and with a conveyance device disposed at the wellsite surface. The control system may be operable to cause the conveyance device to unwind a conveyance line connected with a tool string disposed within a wellbore, and cause the fluid pump to pump a fluid into the wellbore such that the fluid moves the tool string along the wellbore while the conveyance device unwinds the conveyance line.

13 Claims, 6 Drawing Sheets

(56) References Cited

U.S. PATENT DOCUMENTS

| | | | |
|---|---|---|---|
| 2012/0199400 A1* | 8/2012 | Boulet | E21B 17/1085 |
| | | | 175/325.2 |
| 2014/0238660 A1* | 8/2014 | Ash | E21B 33/126 |
| | | | 166/101 |
| 2015/0083408 A1 | 3/2015 | Coles | |
| 2017/0145760 A1* | 5/2017 | Poyet | E21B 23/00 |
| 2017/0167949 A1* | 6/2017 | Xia | G01V 8/10 |
| 2017/0314353 A1* | 11/2017 | Viassolo | E21B 23/08 |
| 2018/0073346 A1* | 3/2018 | Urdaneta | E21B 47/005 |
| 2018/0334898 A1* | 11/2018 | Zha | E21B 44/02 |
| 2018/0363422 A1* | 12/2018 | Roberts, IV | G01N 33/2823 |
| 2019/0048716 A1* | 2/2019 | Perry | E21B 47/14 |
| 2019/0203575 A1* | 7/2019 | Schlosser | B66D 1/505 |

FOREIGN PATENT DOCUMENTS

| | | |
|---|---|---|
| WO | 2014099723 A1 | 6/2014 |
| WO | 2015199720 A1 | 12/2015 |
| WO | 2016080982 A1 | 5/2016 |
| WO | 2018026744 A1 | 2/2018 |

\* cited by examiner

AUTOMATED PUMP-DOWN

CROSS-REFERENCE TO RELATED APPLICATIONS

This application claims priority to and the benefit of U.S. Provisional Application No. 62/809,962, titled "AUTOMATED PUMP-DOWN," filed Feb. 25, 2019, the entire disclosure of which is hereby incorporated herein by reference.

BACKGROUND OF THE DISCLOSURE

Wells are generally drilled into a land surface or ocean bed to recover natural deposits of oil, gas, and other natural resources that are trapped in subterranean formations in the Earth's crust. Testing and evaluation of completed and partially finished wells has become commonplace, such as to increase well production and return on investment. Downhole measurements of formation pressure, formation permeability, and recovery of formation fluid samples, may be useful for predicting economic value, production capacity, and production lifetime of geological formations. Furthermore, perforating, fracturing, and other intervention operations in completed wells may also be performed to optimize well productivity.

Downhole tools, such as plugging and perforating tools, may be utilized to set a plug within a well to isolate a subterranean formation surrounding the wellbore from another subterranean formation and then perforate a casing and the isolated subterranean formation to prepare the well for production. The plugging and perforating tools may be included as part of the tool string and deployed downhole along with other downhole tools. The tool string may be conveyed along the wellbore by applying controlled tension to the tool string from a wellsite surface via a conveyance line or other conveyance means.

In some downhole applications, such as in horizontal or otherwise deviated wellbores or when multiple bends are present along the wellbore, water or another fluid may be pumped into the wellbore above (or behind) the tool string to push or "pump-down" the tool string to an intended depth along the wellbore. Downhole conveyance of the tool string is managed by a human wellsite operator who monitors and controls depth, speed, and/or other downhole parameters of the tool string. Pumping operations are managed by another human wellsite operator who monitors and controls flow and pressure of the pumped fluid based on the depth, speed, and/or other downhole parameters of the tool string being conveyed. The wellsite operators visually monitor their equipment via corresponding control panels at the wellsite surface to identify detrimental or otherwise undesirable operational parameters or events, as well as to manually implement processes to counteract such parameters or events via the corresponding control panels. An example undesirable operational event may include a "pump-off" event, during which excessive fluid pressure above the tool string causes excessive tension of the conveyance line, thereby causing a cable head of the tool string to disconnect the conveyance line from the tool string. Another undesirable operational event may also include a "stick-slip" event, during which the tool string systematically sticks to and slips along a sidewall of the wellbore, slowing down the rate at which the tool string progresses along the wellbore, among other potentially adverse effects. However, relying on multiple human wellsite operators to visually monitor and manually control the wellsite equipment results in an inefficient conveyance of the tool string, because undesirable operational parameters and events are very difficult to prevent and control via manual control of the wellsite equipment.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
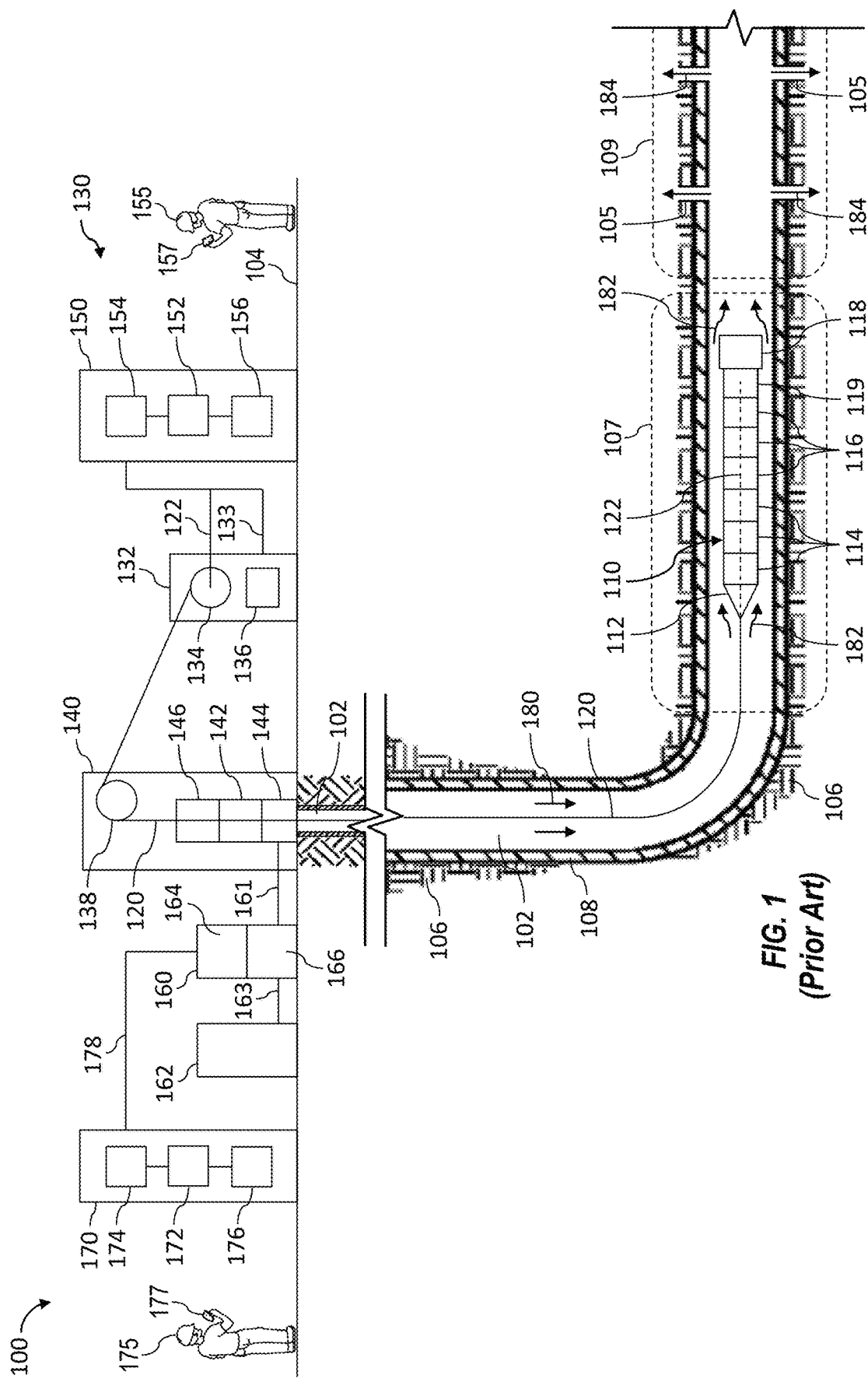
FIG. 1 is a schematic view of at least a portion of an example implementation of apparatus related to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows, may include embodiments in which the first and second features are formed in direct contact, and may also include embodiments in which additional features may be formed interposing the first and second features, such that the first and second features may not be in direct contact.

Terms, such as upper, upward, above, lower, downward, and/or below are utilized herein to indicate relative positions and/or directions between apparatuses, tools, components, parts, portions, members and/or other elements described herein, as shown in the corresponding figures. Such terms do not necessarily indicate relative positions and/or directions when actually implemented. Such terms, however, may indicate relative positions and/or directions with respect to a wellbore when an apparatus according to one or more aspects of the present disclosure is utilized or otherwise disposed within the wellbore.

FIG. 1 is a schematic view of at least a portion of an example implementation of a wellsite system 100, which represents an example environment in which one or more aspects of the present disclosure described below may be implemented. The well site system 100 is depicted in relation to a wellbore 102 formed by rotary and/or directional drilling from a wellsite surface 104 and extending into a subterranean formation 106. The wellsite system 100 may facilitate recovery of oil, gas, and/or other materials that are trapped in the formation 106 via the wellbore 102. The wellbore 102 may be a cased-hole implementation comprising a casing 108 secured by cement (not shown). However, one or more aspects of the present disclosure are also applicable to and/or readily adaptable for utilizing in open-hole implementations lacking the casing 108 and cement. It is also noted that although the wellsite system 100 is depicted as an onshore implementation, it is to be understood that the aspects described below are also generally applicable to offshore implementations.

The wellsite system 100 includes surface equipment 130 located at the wellsite surface 104 and a downhole intervention and/or sensor assembly, referred to as a tool string 110, conveyed within the wellbore 102 into one or more formations 106 via a conveyance line 120 operably coupled with one or more pieces of the surface equipment 130. The conveyance line 120 may be or comprise a cable, a wireline, a slickline, a multiline, an e-line, and/or other conveyance means. Although the tool string 110 is shown disposed in a horizontal portion of the wellbore 102, it is to be understood that the tool string 110 may be utilized within vertical and otherwise deviated portions of the wellbore 102.

The conveyance line 120 may be operably connected with a conveyance device 132 (e.g., a wireline conveyance unit) operable to apply an adjustable tension to the tool string 110 via the conveyance line 120 to convey the tool string 110 along the wellbore 102. The conveyance device 132 may be or comprise a winch conveyance system comprising a reel or drum 134 storing thereon a wound length of the conveyance line 120. The drum 134 may be rotated by a rotary actuator 136 (e.g., an electric motor, a hydraulic motor, etc.) to selectively unwind and wind the conveyance line 120 to apply an adjustable tensile force to the tool string 110 to selectively convey the tool string 110 into and out of the wellbore 102. The conveyance line 120 may be supported and guided between the conveyance device 132 and the wellbore 102 by one or more sheaves or pulleys 138, one or more of which may be supported above the wellbore 102 via a mast, derrick, crane, and/or other support structure 140.

The conveyance line 120 may comprise one or more metal support wires or cables configured to support the weight of the downhole tool string 110. The conveyance line 120 may also comprise one or more insulated electrical and/or optical conductors 122 operable to transmit electrical energy (i.e., electrical power) and electrical and/or optical signals (e.g., information, data) between one or more portions of the tool string 110 and one or more components of the surface equipment 130, such as a tool string control system 150. The conveyance line 120 may comprise and/or be operable in conjunction with means for communication between the tool string 110, the conveyance device 132, and/or one or more other portions of the surface equipment 130, including the tool string control system 150.

The wellbore 102 may be capped by a plurality (e.g., a stack) of fluid control devices 142, which may include a Christmas tree comprising fluid control valves, spools, and fittings individually and/or collectively operable to direct and control the flow of formation fluids out of the wellbore 102. The fluid control devices 142 may also or instead comprise a BOP stack selectively operable to prevent the flow of the formation fluids out of the wellbore 102. The fluid control devices 142 may be mounted on top of a wellhead 144 terminating the wellbore 102 at the surface 104.

The tool string 110 may be deployed into or retrieved from the wellbore 102 via the conveyance device 132 through the fluid control devices 142, the wellhead 144, and/or a sealing and alignment assembly 146 mounted on the fluid control devices 142 and operable to seal the conveyance line 120 during deployment, conveyance, intervention, and other wellsite operations. The pulley 138 may thus guide the conveyance line 120 between the conveyance device 132 and the sealing and alignment assembly 146. The sealing and alignment assembly 146 may comprise a lock chamber (e.g., a lubricator, an airlock, a riser, etc.) mounted on the fluid control devices 142 and a stuffing box operable to seal around the conveyance line 120 at top of the lock chamber. The stuffing box may be operable to seal around an outer surface of the conveyance line 120, such as via annular packings applied around the surface of the conveyance line 120 and/or by injecting a fluid between the outer surfaces of the conveyance line 120 and an inner wall of the stuffing box.

The tool string control system 150 may be operable to monitor and control operation of the downhole tool string 110. The tool string control system 150 may also or instead be operable to monitor and control operation of the conveyance device 132 to thereby monitor and control conveyance of the downhole tool string 110. The tool string control system 150 may be or comprise a control station or facility (e.g., a cabin, a trailer, a skid, etc.) containing a control workstation 152, which may be operated by a human wellsite operator 155 (hereinafter a "tool string operator") to monitor and control conveyance and operation of the tool string 110. The control workstation 152 may comprise or be communicatively connected with a processing device 154 (e.g., a programmable logic controller (PLC), a computer (PC), an industrial computer (IPC), etc.), such as may be operable to receive, process, and output information to monitor operations and facilitate control of one or more portions of the well site system 100.

For example, the processing device 154 may be communicatively connected with the rotary actuator 136 and/or other portions of the conveyance device 132, such as various sensors associated with the conveyance device 132, via an electrical conductor 133, such as may facilitate monitoring of various operational parameters of the conveyance device 132 (e.g., rotational speed, rotational position, line tension, etc.) and, thus, facilitate monitoring of various operational parameters of the tool string 110 (e.g., depth, conveyance speed, line tension, etc.). The processing device 154 may be communicatively connected with the tool string 110 and/or various portions thereof, such as various sensors and actuators of the tool string 110 via the conductor 122, to facilitate monitoring and/or control of various operational parameters of the tool string 110.

The control workstation 152 may be operable for entering or otherwise communicating commands to the processing device 154 by the tool string operator 155, and for displaying or otherwise communicating information from the processing device 154 to the tool string operator 155. The control workstation 152 may comprise or be communicatively connected with one or more human-machine interface (HMI) devices 156, such as one or more input devices (e.g., control levers of manual fluid control valves, electrical joysticks, electrical control buttons, a keyboard, a mouse, a touchscreen, etc.) and one or more output devices (e.g., indicator gauges, a video monitor, a printer, audio speakers, etc.). The tool string control system 150 may be located at the wellsite surface 104 or on a structure located at the wellsite surface 104.

The tool string control system 150 may be electrically or otherwise communicatively connected with the tool string 110 via the electrical conductor 122 extending through at least a portion of the tool string 110, through the conveyance line 120, and externally from the conveyance line 120 at the wellsite surface 104 via a rotatable joint or coupling (e.g., a collector) (not shown) carried by the drum 134. The electrical conductor 122 may transmit and/or receive electrical power, data, and/or control signals between the tool string control system 150 and one or more portions of the tool string 110. However, the tool string 110 may also or instead be communicatively connected with the tool string controller 150 by other means, such as capacitive or inductive coupling. The electrical conductor 122 extending through the tool string 110 may comprise one or more electrical conductors, connectors, and/or interfaces associated with and electrically connecting the various portions of the tool string 110. Thus, the electrical conductor 122 may further facilitate electrical communication between two or more portions of the tool string 110.

The tool string 110 may comprise a cable head 112 (e.g., a logging head or a cable termination sub) physically and/or electrically connecting the conveyance line 120 with the tool string 110, such as may permit the tool string 110 to be suspended and conveyed within the wellbore 102 via the conveyance line 120. The cable head 112 may be selectively operable to release or otherwise disconnect from the conveyance line 120 to disconnect the tool string 110 from the conveyance line 120 while the tool string 110 is conveyed within the wellbore 102. Accordingly, if a portion of the tool string 110 is stuck within the wellbore 102 and cannot be freed, the cable head 112 may be operated to release or otherwise disconnect from the conveyance line 120 such that the conveyance line 120 may be retrieved to the wellsite surface 104.

The tool string 110 may comprise one or more downhole devices, modules, subs, and/or other downhole tools 114 operable to perform intended downhole operations. The tools 114 of the tool string 110 may each be or comprise an acoustic tool, a cutting tool, a density tool, a directional tool, an electrical power module, an electromagnetic (EM) tool, a formation logging tool, a formation measurement tool, a formation testing tool, a fluid sampling tool, a gravity tool, a hydraulic power module, a jarring tool, a magnetic resonance tool, a mechanical interface tool, a monitoring tool, a neutron tool, a nuclear tool, a perforating tool, a photoelectric factor tool, a porosity tool, a power module, a ram, a release tool, a reservoir characterization tool, a resistivity tool, a seismic tool, a stroker tool, and/or a surveying tool, among other examples also within the scope of the present disclosure.

A tool 114 of the tool string 110 may be or comprise a telemetry/control tool, such as may facilitate communication between the tool string 110 and the tool string control system 150 and/or control of one or more portions of the tool string 110. The telemetry/control tool may comprise a downhole controller (not shown) communicatively connected with the tool string control system 150 via the conductor 122 and with other portions of the tool string 110. The downhole controller may be operable to receive, store, and/or process control commands from the tool string control system 150 for controlling one or more portions of the tool string 110. The downhole controller may be further operable to store and/or communicate to the tool string control system 150 signals or information output by one or more sensors of the tool string 110.

A tool 114 of the tool string 110 may further be or comprise one or more position, inclination, and/or directional sensors, such as one or more accelerometers, magnetometers, gyroscopic sensors (e.g., micro-electro-mechanical system (MEMS) gyros), and/or other sensors for determining the position, orientation, and/or direction of the tool string 110 within the wellbore 102. Gyros, accelerometers, and/or other sensors may also form or be utilized as part of an inertial navigation system (INS) to determine downhole position (e.g., XYZ position) and/or orientation of the tool string 110. A tool 114 of the tool string 110 may be or comprise a depth correlation tool, such as a casing collar locator (CCL) for detecting ends of casing collars by sensing a magnetic irregularity caused by the relatively high mass of an end of a collar of the casing 108. The depth correlation tool may also or instead be or comprise a gamma ray (GR) tool that may be utilized for depth correlation. The CCL and/or GR may be utilized to determine the position (i.e., depth) of the tool string 110 or portions thereof, such as with respect to known casing collar numbers and/or positions within the wellbore 102. The CCL and/or GR may also be utilized to determine the speed or rate at which the tool string 110 is conveyed within the wellbore 102. Therefore, the CCL and/or GR tools may be utilized to detect and/or log the location of the tool string 110 within the wellbore 102, such as during deployment within the wellbore 102 or other downhole operations.

The tool string 110 may also comprise one or more perforating guns or tools 116, such as may be operable to perforate or form holes though the casing 108 and the cement and into the portion of the formation 106 surrounding the wellbore 102 to prepare the well for fracturing operations. Each perforating tool 116 may contain one or more shaped explosive charges operable to perforate the casing 108, the cement, and the formation 106 upon detonation. The tool string 110 may also comprise a plug 118 and a plug setting tool 119 for setting the plug 118 at a predetermined position within the wellbore 102, such as to isolate or seal an upper (i.e., uphole) portion of the wellbore 102 extending though an upper formation zone 107 from a lower (i.e., downhole) portion of the wellbore 102 extending though a lower formation zone 109. The plug 118 may be permanent or retrievable, facilitating the lower formation zone 109 being permanently or temporarily isolated or sealed from the upper formation zone 107 before perforating operations.

The surface equipment 130 of the wellsite system 100 may further comprise a pumping system operable to inject a fluid (e.g., water) into the wellbore to perform an intended downhole operation. The pumping system may comprise one or more fluid pump units 160 operable to inject the fluid from a fluid container 162 into the wellbore 102 via the wellhead 144 or another ported device (e.g., ported adapter) connected above the wellbore 102. Each fluid pump unit 160 may be fluidly connected with the wellbore 102 and the fluid container 162 via corresponding fluid conduits 161, 163, respectively. Each fluid pump unit 160 may comprise a rotary actuator (e.g., an engine, an electric motor, etc.) 164 operable to selectively actuate (e.g., operate, rotate) a fluid pump 166 to transfer the fluid from the fluid container 162 into the wellbore 102 at selectively variable flowrates and/or pressures.

The surface equipment 130 may further comprise a pumping control system 170 operable to monitor and control operation of the fluid pumping system to thereby monitor and control various operational parameters of the fluid being injected into the wellbore 102. The pumping control system 170 may be or comprise a control station or facility (e.g., a cabin, a trailer, a skid, etc.) containing a control workstation 172, which may be operated by a human wellsite operator 175 (hereinafter a "pump operator") to monitor and control operation of the fluid pump unit 160. The control workstation 172 may comprise or be communicatively connected with a processing device 174 (e.g., a PLC, a PC, an IPC, etc.), such as may be operable to receive, process, and output information to monitor operations and facilitate control of one or more portions of the fluid pumping system. The processing device 174 may be communicatively connected with the fluid pump unit 160 via an electrical conductor 178. For example, the processing device 174 or another portion of the pumping control system 170 may be communicatively connected with the rotary actuator 164 and/or various sensors of the fluid pump unit 160, such as may facilitate monitoring and/or control of various operational parameters (e.g., flow rate, pressure, temperature, etc.) of the fluid being injected into the wellbore 102.

The control workstation 172 may be operable for entering or otherwise communicating commands to the processing device 174 by the pump operator 175, and for displaying or otherwise communicating information from the processing device 174 to the pump operator 175. The control workstation 172 may comprise or be communicatively connected with one or more HMI devices 176, such as one or more input devices (e.g., control levers of manual fluid control valves, electrical joysticks, electrical control buttons, a keyboard, a mouse, a touchscreen, etc.) and one or more output devices (e.g., indicator gauges, a video monitor, a printer, audio speakers, etc.). The pumping control system 170 may be located at the wellsite surface 104 or on a structure located at the wellsite surface 104.

The various equipment of the wellsite system 100 may be collectively operated by the human operators 155, 175 to perform pump-down operations to convey the tool string 110 to an intended depth along the wellbore 102. The pump-down operations may be utilized to move the tool string 110 along the wellbore 102, such as to facilitate wellbore plugging and perforating ("plug and perf") operations. For example, the tool string 110 may be conveyed along the wellbore 102 to set the plug 118 within the wellbore 102 between the upper and lower formation zones 107, 109 to fluidly isolate the upper formation zone 107 that has not yet been perforated from the lower formation zone 109 that has already been perforated, and to then perforate the upper formation zone 107.

During pump-down operations, after the tool string 110 is made up and positioned within the wellbore 102 or within the wellhead 144 below the fluid control devices 142 (e.g., the BOP stack), the pump operator 175 utilizes the pumping control system 170 to operate the fluid pump unit 160 to inject a fluid into the wellbore 102 above (i.e., uphole from) the tool string 110 via the wellhead 144 or another ported device. The fluid may instead be injected into the wellbore 102 when the tool string 110 is conveyed within a vertical portion of the wellbore 102 or when the tool string 110 stops descending within the wellbore 102 by way of gravity. The fluid injected into the wellbore 102 flows downhole, as indicated by arrows 180, thereby forming an increased pressure zone above (or behind) the tool string 110 that is greater than a fluid pressure below (or in front of) the tool string 110. Such pressure differential pushes or otherwise imparts a force operable to move the tool string 110 in the downhole direction. The fluid flowing downhole 180 can also cause friction or drag while the fluid flows around or past the tool string 110, as indicated by arrows 182. The friction drags or otherwise imparts a force to the tool string 110 operable to move the tool string 110 in the downhole direction. During the pump-down operations, the fluid passing 182 the tool string 110 escapes from the wellbore 102 into the formation 106 downhole from of the tool string 110 via previously made perforations 105, as indicated by arrows 184, thereby permitting the fluid pumped into the wellbore 102 to continually flow around or past the tool string 110 until the tool string 110 is conveyed to an intended depth within the wellbore 102.

While the fluid is being injected into the wellbore 102 by the fluid pump unit 160 during the pump-down operations, the conveyance device 132 may be operated to selectively unwind the conveyance line 120 to permit the pumped fluid to move the tool string 110 downhole along the wellbore 102. The conveyance of the tool string 110 along the wellbore 102 may be managed by the tool string operator 155, such as by utilizing the tool string control system 150 to operate the conveyance device 132 to selectively rotate the drum 134 to unwind the conveyance line 120 at an intended speed. The speed at which the tool string 110 is conveyed (e.g., permitted to move) along the wellbore 102 and the flow rate at which the fluid is injected by the pump unit 160 into the wellbore 102 matches or is otherwise harmonized or coordinated with each other. For example, if the flow rate of the fluid injected into the wellbore 102 exceeds or is too large for a given downhole speed of the tool string 110, the pressure differential across the tool string 110 may impart an excessive downhole force to the tool string 110, causing an excessive tension in the conveyance line 120. Such excessive tension is transferred or otherwise applied to the tool string 110, which can cause the conveyance line 120 to be pulled out of or otherwise separated from the cable head 112. Such event may be referred to as a "pump-off." Furthermore, if the flow rate of the fluid injected into the wellbore 102 is too low for a given rate at which the conveyance line 120 is unwound from the drum 134, the tool string 110 can repetitively (e.g., cyclically and/or systematically) stick to and then slip along a sidewall of the wellbore 102, thereby slowing down or otherwise reducing efficiency at which the tool string 110 moves along the wellbore 102. Such events may be referred to as "stick-slip."

FIGS. 2-5 are graphs showing example operational parameters detected during pump-down operations performed via the wellsite system 100 shown in FIG. 1, wherein the fluid pump unit 160 and the conveyance device 132 are coordinated manually by the wellsite operators 155, 175 and, thereby, result in repetitive stick-slip of the tool string 110. Stick events are shown taking place at times $T_{ST1}$-$T_{ST6}$ and slip events are shown taking place at times $T_{SL1}$-$T_{SL5}$. The following description refers to FIGS. 1-5, collectively.

Figure 2:
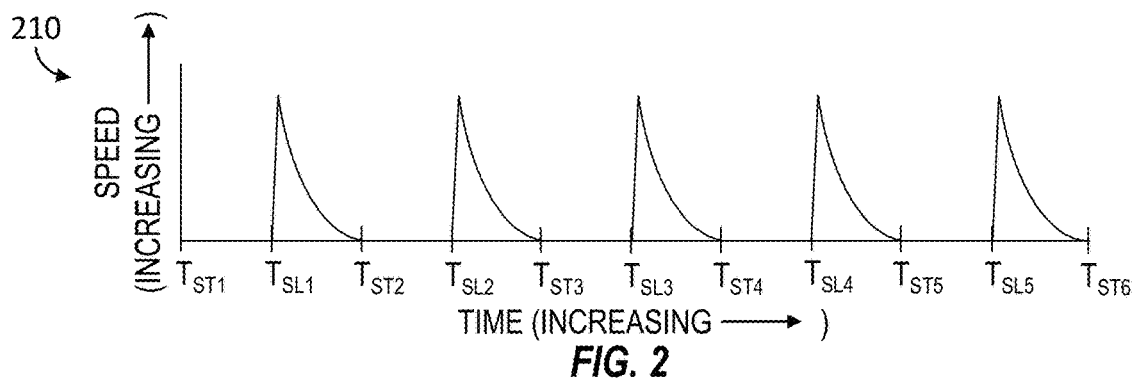
FIGS. 2-5 are graphs related to one or more aspects of the present disclosure.

FIG. 2 is a graph 210 showing measured speed at which the tool string 110 moves downhole along the wellbore 102 with respect to time. The graph 210 demonstrates that, while experiencing stick-slip, the tool string 110 alternatingly stops moving when the tool string 110 sticks to the sidewall of the wellbore 102 at times $T_{ST1}$-$T_{ST6}$ and quickly accelerates and decelerates when the tool string 110 slips along the sidewall of the wellbore 102 at times $T_{SL1}$-$T_{SL5}$.

Figure 3:
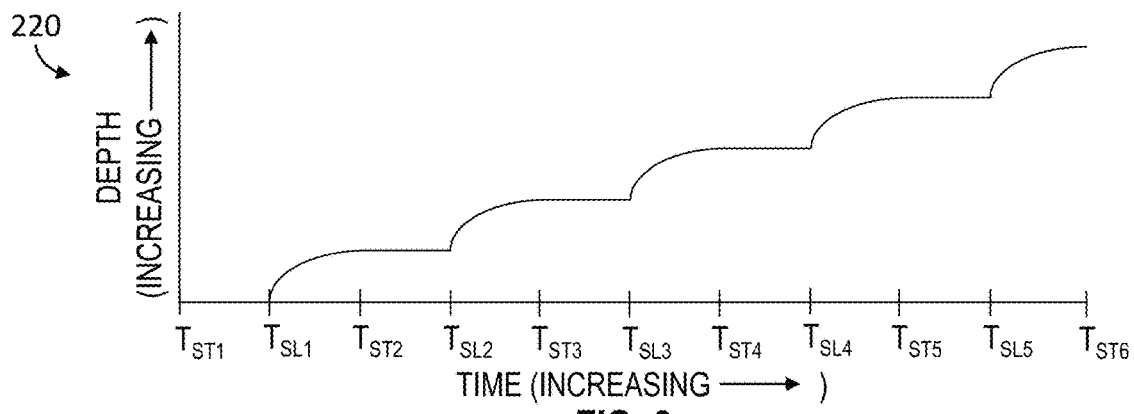

FIG. 3 is a graph 220 showing measured depth of the tool string 110 within the wellbore 102 with respect to time. The graph 220 demonstrates that, while experiencing stick-slip, the tool string 110 alternatingly stops moving when the tool string 110 sticks to the sidewall of the wellbore 102 at times $T_{ST1}$-$T_{ST6}$ and moves downhole at a decreasing speed when the tool string 110 slips along the sidewall of the wellbore 102 at times $T_{SL1}$-$T_{SL5}$.

Figure 4:
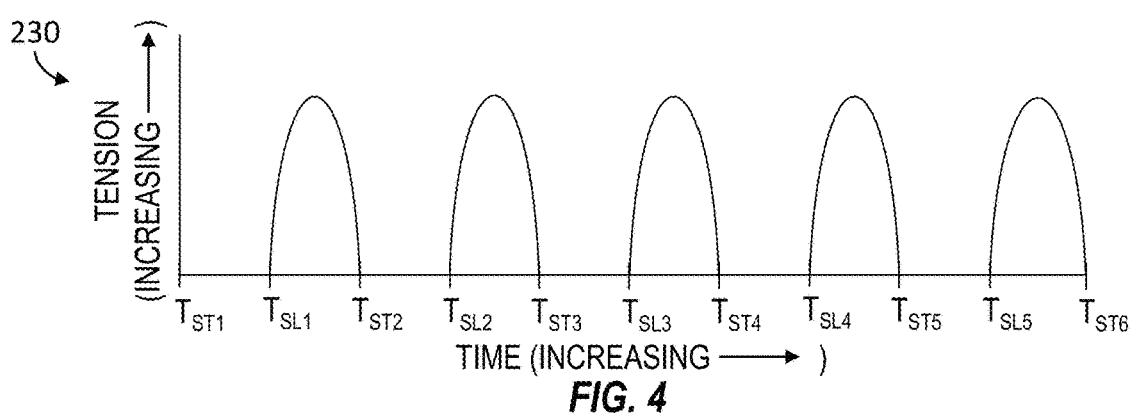

FIG. 4 is a graph 230 of measured tension of the conveyance line with respect to time. The graph 230 demonstrates that, while experiencing stick-slip, the tension decreases when the tool string 110 sticks to the sidewall of the wellbore 102 at times $T_{ST1}$-$T_{ST6}$ and quickly increases and decreases when the tool string 110 slips along the sidewall of the wellbore 102 at times $T_{SL1}$-$T_{SL5}$.

Figure 5:
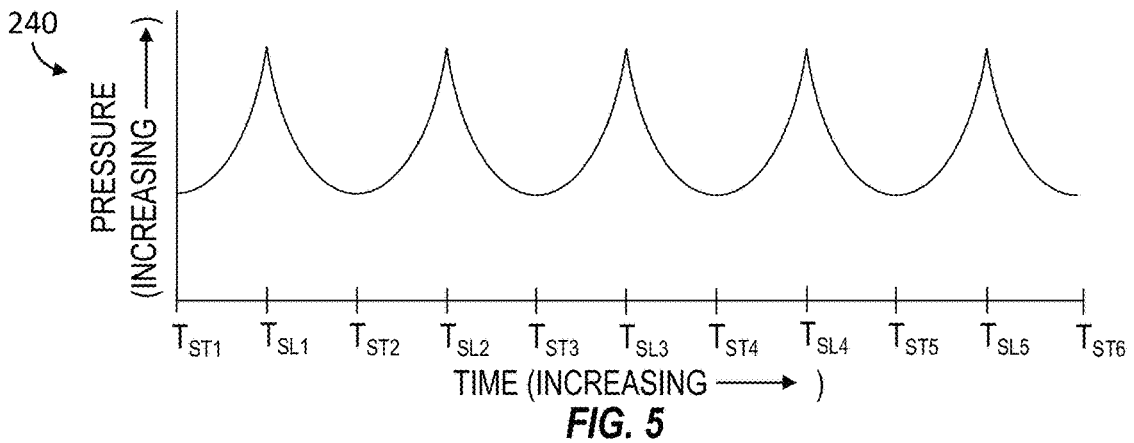

FIG. 5 is a graph 240 showing measured fluid pressure above the tool string 110 with respect to time. The graph 240 demonstrates that, while experiencing stick-slip, the pressure above the tool string 110 alternatingly increases when the tool string 110 sticks to the sidewall of the wellbore 102 at times $T_{ST1}$-$T_{ST6}$ and decreases when the tool string 110 slips along the sidewall of the wellbore 102 at times $T_{SL1}$-$T_{SL5}$.

The operators 155, 175 may attempt to match or harmonize the rate of fluid flow and speed at which the conveyance line 120 is unwound in an attempt to prevent, inhibit, or reduce the stick-slip. For example, the human operators 155, 175 may exchange verbal communications, such as via mobile communication devices 157, 177, and/or visual signals, such as via sign language, gestures, or hand held signs, among other examples, in an attempt to coordinate their respective manual actions directed to controlling the conveyance device 132 and the fluid pump unit 160. During pump-down operations, the tool string operator 155 may monitor surface measurements of depth, tension, speed, pressure, and/or other parameters associated with the tool string 110 and instruct the fluid pump operator 175 to increase, decrease, or maintain the flow rate based on such depth, tension, speed, pressure, and/or other measured parameters associated with the tool string 110. However, depth, tension, speed, pressure, flow rate, friction, and/or other operational parameters can change very quickly downhole during pump-down operations, thereby making it very difficult, if not impossible, for the operators 155, 175 to manually match or otherwise harmonize the flow rate of the fluid injected into the wellbore 102 and the rate at which the conveyance line 120 is unwound from the drum 134. Accordingly, pump-off and stick-slip events are a problem during pump-down operations.

Figure 6:
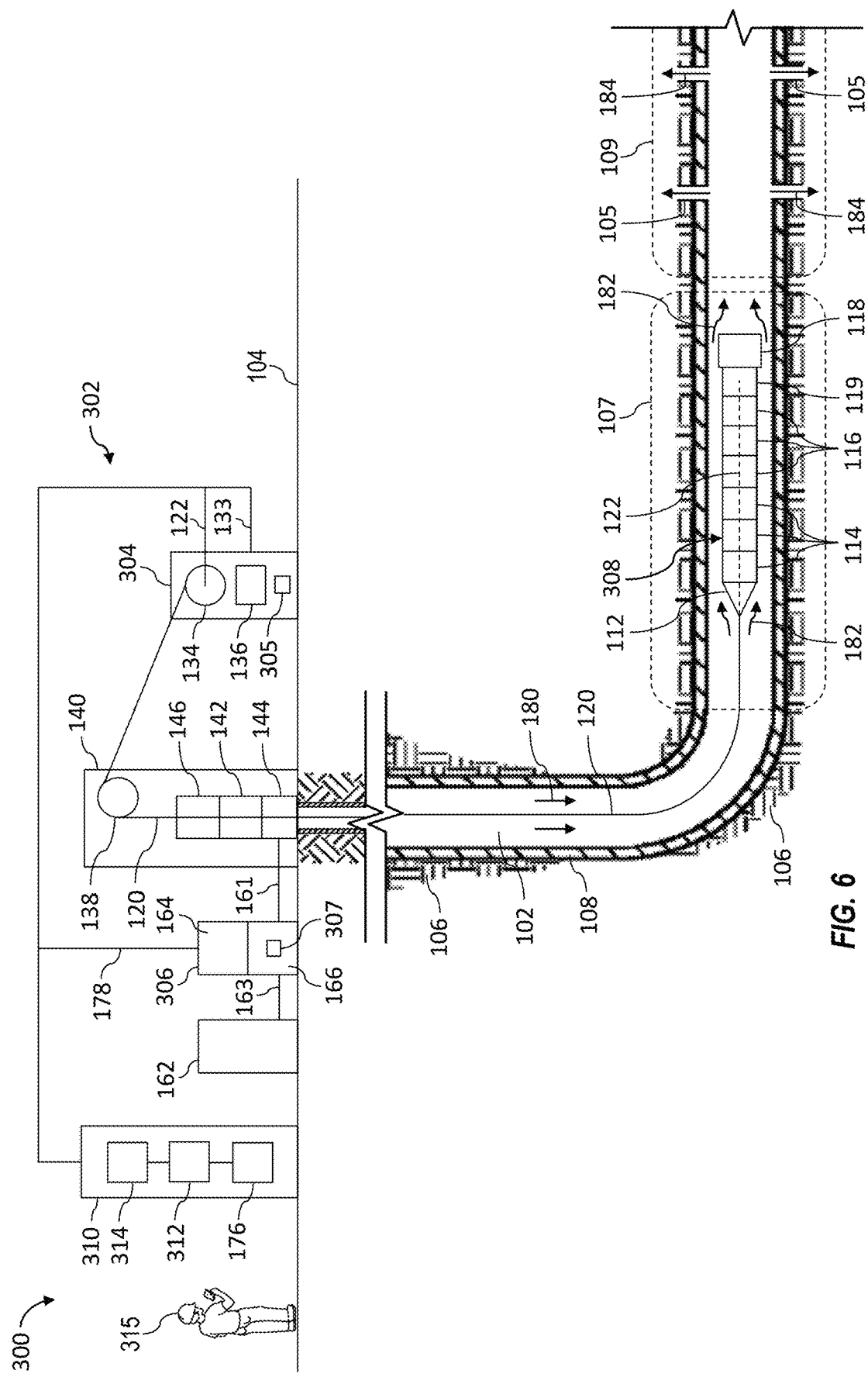
FIG. 6 is a schematic view of at least a portion of an example implementation of apparatus according to one or more aspects of the present disclosure.

FIG. 6 is a schematic view of at least a portion of an example implementation of a wellsite system 300 according to one or more aspects of the present disclosure. The wellsite system 300 may comprise one or more features and/or perform one or more operations of the wellsite system 100 shown in FIG. 1, including where indicated by the same reference numerals. Accordingly, the following description refers to FIGS. 1-6, collectively.

The wellsite system 300 is depicted in relation to a wellbore 102 formed by rotary and/or directional drilling from a wellsite surface 104 and extending into a subterranean formation 106. The wellsite system 300 may be utilized to facilitate recovery of oil, gas, and/or other materials that are trapped in the formation 106 via the wellbore 102. The wellbore 102 may be a cased-hole implementation comprising a casing 108 secured by cement (not shown). However, one or more aspects of the present disclosure are also applicable to and/or readily adaptable for utilizing in openhole implementations lacking the casing 108 and cement. It is also noted that although the wellsite system 300 is depicted as an onshore implementation, it is to be understood that the aspects described below are also generally applicable to offshore implementations.

The wellsite system 300 includes surface equipment 302 located at the wellsite surface 104 and a downhole intervention and/or sensor assembly, referred to as a tool string 308, conveyed within the wellbore 102 into one or more formations 106 via a conveyance line 120 operably coupled with one or more pieces of the surface equipment 302. The tool string 308 may comprise one or more features and/or perform one or more operations of the tool string 110, including where indicated by the same reference numerals. Although the tool string 308 is shown disposed in a horizontal portion of the wellbore 102, it is to be understood that the tool string 308 may be utilized within vertical and otherwise deviated portions of the wellbore 102.

The various equipment of the wellsite system 300 may be collectively operable to perform pump-down operations to convey the tool string 308 to an intended depth along the wellbore 102. The pump-down operations may be utilized to move the tool string 308 along the wellbore 102 to facilitate downhole operations, such as wellbore plug and perf operations. For example, the tool string 308 may be conveyed along the wellbore 102 to set a plug 118 within the wellbore 102 between upper (or uphole) and lower (or downhole) formation zones 107, 109 to fluidly isolate the upper formation zone 107 that has not yet been perforated from the lower formation zone 109 that has already been perforated, and then to perforate the upper formation zone 107.

A conveyance line 120 may be operably connected with a conveyance device 304 (e.g., a wireline conveyance unit) operable to apply an adjustable tension to the tool string 308 via the conveyance line 120 to convey the tool string 308 along the wellbore 102. The conveyance device 304 may comprise one or more features and/or perform one or more operations of the conveyance device 132, including where indicated by the same reference numerals. The conveyance device 304 may comprise one or more sensors 305 mounted in, on, or otherwise disposed in association with the conveyance device 304. The one or more sensors 305 are operable to output signals or information indicative of measurements of various operational parameters of the conveyance device 304 and the tool string 308 connected to the conveyance device 304 via the conveyance line 120.

The surface equipment 302 may further comprise a pumping system operable to inject a fluid (e.g., water) into the wellbore 102 to perform an intended downhole operation. The pumping system may comprise one or more fluid pump units 306 operable to inject the fluid from a fluid container 162 into the wellbore 102 via a wellhead 144 or another ported device (e.g., ported adapter) connected to the wellbore 102. The fluid pump unit 306 may comprise one or more features and/or perform one or more operations of the fluid pump unit 160, including where indicated by the same reference numerals. The fluid pump unit 306 may comprise one or more sensors 307 mounted on or otherwise disposed in association with the fluid pump unit 306 and operable to output signals or information indicative of measurements of various operational parameters of the fluid pump unit 306 and of the fluid pumped by the fluid pump unit 306. The pumping system may be or comprise a portion of a formation fracturing system, wherein the fluid pump unit 306 is or comprises a fracturing pump unit for pumping a fracturing fluid into the wellbore 102 during fracturing operations. However, as described herein, such fracturing pump unit may be utilized to pump water or another fluid into the wellbore 102 to perform pump-down operations.

The surface equipment 302 may further comprise a control system 310 operable to automate the pump-down operations. The control system 310 may be communicatively connected with and operable to monitor and control operation of the fluid pump unit 306 to thereby monitor and control various parameters of the fluid being injected into the wellbore 102. The control system 310 may be communicatively connected with and operable to monitor and control operations of the conveyance device 304 to selectively monitor and control various operational parameters of the tool string 308. The control system 310 may be communicatively connected with the tool string 308 to monitor operational and/or environmental parameters of and/or adjacent (e.g., around) the tool string 308.

The control system 310 may be or comprise a control station (e.g., a skid) or facility (e.g., a cabin, a trailer, etc.) containing a control workstation 312, which may be operated by a human wellsite operator 315 to monitor and control operation of the fluid pump unit 306, the conveyance device 304, and/or the tool string 308. The control workstation 312 may comprise or be communicatively connected with a processing device 314 (e.g., a PLC, a PC, an IPC, etc.), such as may be operable to receive, process, and output information automatically and in real-time to monitor and control the fluid pump unit 306, the conveyance device 304, and/or the tool string 308. The processing device 314 may be further operable to store executable programs, instructions, and/or operational parameters or set-points, including for implementing one or more aspects of methods, processes, and operations described herein. The control workstation 312 may be operable for entering or otherwise communicating commands to the processing device 314 by the wellsite operator 315, and for displaying or otherwise communicating information from the processing device 314 and/or various sensors of the surface equipment 302 and tool string 308 to the wellsite operator 315. The control workstation 312 may comprise or be communicatively connected with one or more HMI devices 316, such as one or more input devices (e.g., control levers of manual fluid control valves, electrical joysticks, electrical control buttons, a keyboard, a mouse, a touchscreen, etc.) and one or more output devices (e.g., indicator gauges, a video monitor, a printer, audio speakers, etc.). The control system 310 may comprise one or more features and/or modes of operation of the pumping control system 170 and/or the tool string control system 150 described above and shown in FIG. 1. Accordingly, the wellsite operator 315 utilizing the control system 310 may be the pump unit operator 175, the tool string operator 155, or another wellsite operator.

Figure 7:
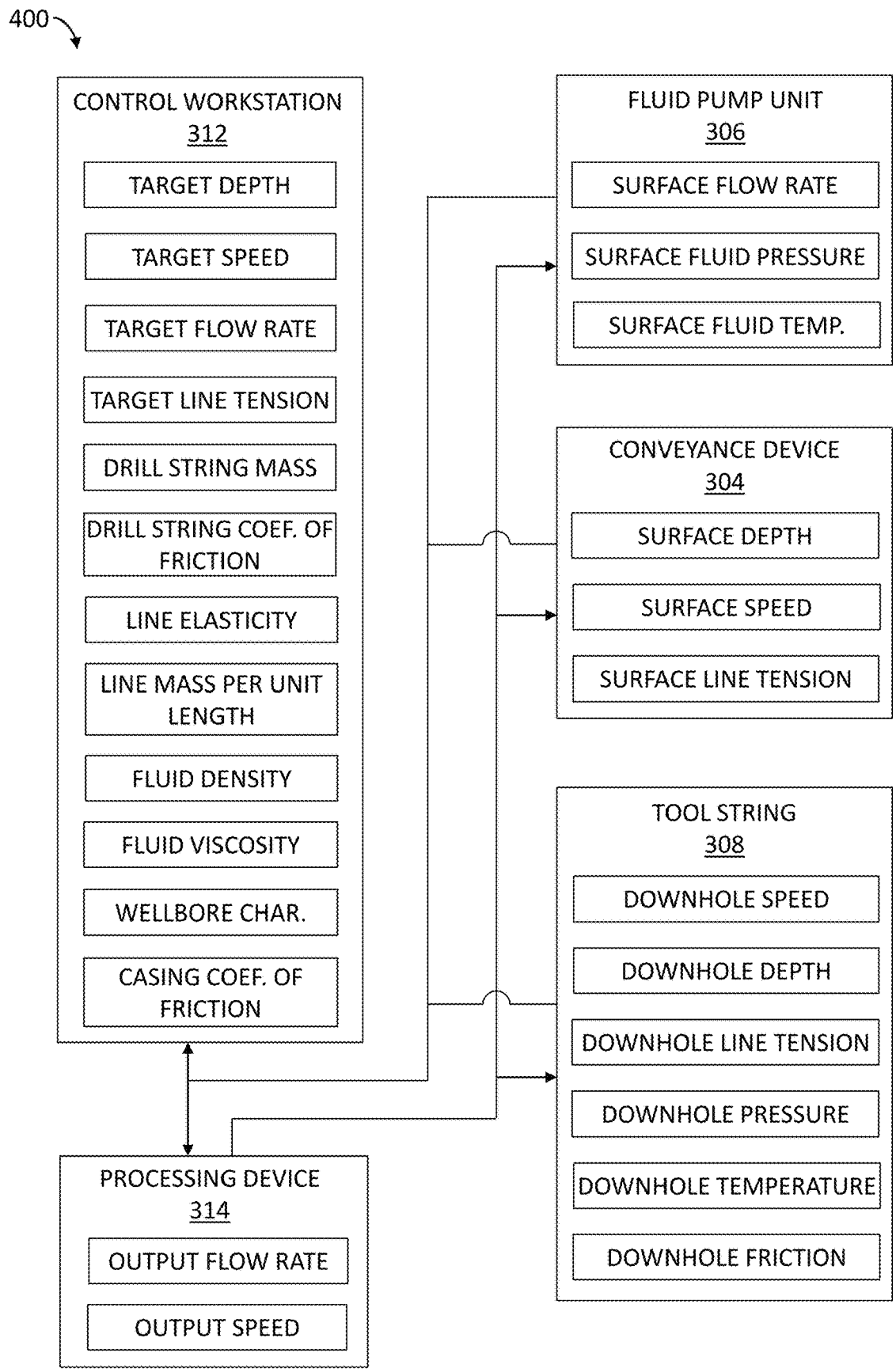
FIG. 7 is a schematic view of at least a portion of an example implementation of apparatus according to one or more aspects of the present disclosure.

FIG. 7 is a schematic view of at least a portion of an example implementation of a control system 400 for automatically controlling movement of the tool string 308 along the wellbore 102, and thereby prevent, inhibit, or reduce the pump-off and stick-slip events. The control system 400 may comprise various equipment or portions of the wellsite system 300 shown in FIG. 6, such as the processing device 314, the control workstation 312, the fluid pump unit 306, the conveyance device 304, and the tool string 308. Accordingly, the following description refers to FIGS. 6 and 7, collectively.

The processing device 314 of the control system 310 may be communicatively connected with the fluid pump unit 306 via an electrical conductor 178. For example, the processing device 314 may be communicatively connected with the rotary actuator 164 and the various sensors 307 associated with the fluid pump unit 306, such as may facilitate monitoring and/or control of various operational parameters of the fluid being injected into the wellbore 102 at the wellsite surface 104. The surface operational parameters measured by the sensors 307 may include, for example, surface fluid flow rate (e.g., via a surface flow sensor), surface fluid pressure (e.g., via a surface pressure sensor), and/or surface fluid temperature (e.g., via a surface temperature sensor), among other operational parameters measured at the wellsite surface 104. The processing device 314 may be operable to receive and process the signals or information indicative of measurements of such operational parameters output by the surface sensors 307. The processing device 314 may be operable to receive and process such measurements of the surface operational parameters, and control the fluid pump unit 306 and the conveyance device 304 based on such received measurements.

The processing device 314 of the control system 310 may be communicatively connected with the conveyance device 304 via an electrical conductor 133. For example, the processing device 314 may be communicatively connected with the rotary actuator 136 and/or the various sensors 305 associated with the conveyance device 304, such as may facilitate monitoring and control of various operational parameters of the conveyance device 304 at the wellsite surface 104. The operational parameters measured at the wellsite surface 104 may include, for example, surface depth of the tool string 308 (e.g., quantity of rotations of the drum 134), surface conveyance speed of the tool string 308 (e.g., rotational speed of the drum 134), and/or surface line tension (e.g., tension of the conveyance line 120 measured at the drum 134), among other operational parameters. The processing device 314 may be operable to receive and process signals or information indicative of measurements of such surface operational parameters output by the surface sensors 305. The processing device 314 may be operable to receive and process such measurements of the surface operational parameters, and control the fluid pump unit 306 and the conveyance device 304 based on such received measurements.

The processing device 314 of the control system 310 may be communicatively connected with the tool string 308 via the conductor 122. For example, the processing device may be communicatively connected with various downhole sensors of the downhole tools 114 making up the tool string 308, such as may facilitate monitoring of various downhole operational parameters of the tool string 308. Thus, one or more of the tools 114 may be or comprise a downhole sensor tool 114 having a plurality of sensors operable to monitor various downhole operational parameters of the tool string 308 and/or environmental (e.g., ambient) parameters (e.g., conditions) affecting the tool string 308. The processing device 314 may be operable to receive and process signals or information indicative of measurements of such downhole operational and/or environmental parameters output by the downhole sensors of the tools 114, and control the fluid pump unit 306 and the conveyance device 304 based on the received downhole measurements.

For example, one or more of the tools 114 may comprise a downhole tension sensor (e.g., a load cell) operable to output a signal or information indicative of measurement of tension experienced by the tool 114. The tension measurement may be utilized to determine tension that the conveyance line 120 is applying to or at the tool string 308. The tension sensor may also or instead be located within the cable head 112. One or more of the tools 114 may comprise a temperature sensor operable to output a signal or information indicative of measurement of downhole temperature, including ambient temperature of the fluid adjacent (e.g., surrounding) the tool string 308. One or more of the tools 114 and/or the cable head 112 may comprise a pressure sensor operable to output a signal or information indicative of measurement of downhole pressure, including pressure of the pumped fluid above and/or below the tool string 308. Other operational parameters measured downhole by one or more of the tools 114 may include downhole position (i.e., depth) and/or downhole conveyance speed of the tool string 308 within the wellbore 102, measured by the INS system, the CCL tool, and/or the GR tool.

One or more of the tools 114 may also or instead facilitate measurement of downhole friction against the sidewall of the wellbore 102. For example, the processing device 314 may be operable to determine friction of the tool string 308 against the sidewall of the wellbore 102 based on, for example, the mass of the tool string 308, the speed of the tool string 308, flow rate of the pumped fluid, tension applied to or at the tool string 308, and/or downhole pressure. The processing device 314 may be operable to determine or receive a friction coefficient between the tool string 308 and the sidewall of the wellbore 102, and/or determine or receive a measurement of force resisting movement of the tool string 308 caused by friction against the sidewall of the wellbore 102. The processing device 314 may be operable to determine or receive a friction coefficient between the conveyance line 120 and the sidewall of the wellbore 102, and/or determine or receive a measurement of force resisting movement of the conveyance line 120 caused by friction against the sidewall of the wellbore 102. Such friction and/or force measurements may be acquired or determined while the tool string 308 and/or the conveyance line 120 are being moved along vertical and deviated portions of the wellbore 102, including any bent or crooked portions (e.g., doglegs) of the wellbore 102. The friction and/or force measurements may be utilized to determine the actual downhole tension that the conveyance line 120 is applying to or at the tool string 308. The difference between measured surface and actual downhole tension of the conveyance line 120 is a factor contributing to pump-off events. Therefore, the measured or otherwise determined downhole tension of the conveyance line 120 may be limited to a predetermined threshold or otherwise considered to prevent or inhibit pump-off events.

Target (i.e., intended) values (e.g., levels, quantities) of operational parameters may also be entered into the processing device 314 by the wellsite operator 315 via the control workstation 312. For example, the processing device 314 may receive a target depth of the tool string 308, a target conveyance speed of the tool string 308, and a target flow rate of the fluid pumped into the wellbore 102 by the pump unit 306. The processing device 314 may receive a target surface and/or downhole conveyance line tension and/or maximum surface and/or downhole conveyance line tension threshold(s) to prevent or inhibit a pump-off event. Physical characteristics or properties of the wellsite system 300 may be entered into the processing device 314 by the wellsite operator 315 via the control workstation 312. For example, the processing device 314 may receive mass of the tool string 308, a coefficient of friction of the tool string 308 against the passing fluid, elasticity or other properties of the conveyance line 120, mass per unit length of the conveyance line 120, density of the fluid being pumped, viscosity of the fluid being pumped, physical characteristics of the wellbore 102 (e.g., path, orientation, inner diameter of the casing 108, depth, etc.), and a coefficient of friction of the casing 108 against the tool string 308 and/or the passing fluid, among other physical properties of the wellsite system 300. The target conveyance speed of the tool string 308 may be selected to automatically change or vary along different portions of the wellbore 102, such as based on the physical characteristics of the wellbore 102.

Similarly as described above with respect to FIGS. 2-5, the tool string 308 may experience stick-slip, during which downhole operational parameters (e.g., downhole speed, downhole depth, downhole conveyance line tension, and downhole fluid pressure) associated with the tool string 308 can continually or cyclically fluctuate. Downhole conveyance line tension may also experience spikes (e.g., such as caused by fluid pressure spikes) that that can cause a pump-off event. The processing device 314 may automatically and in real-time receive the various target values of operational parameters (e.g., downhole operational parameters), the surface and downhole measured operational and environmental parameters, and the physical properties of the drill string 308, the conveyance line 120, the pumped fluid, and the wellbore 102. The processing device 314 may then process such information and, based thereon, output control commands (e.g., control signals or information) to the fluid pump unit 306 and the conveyance device 304 to cause the fluid pump unit 306 and the conveyance device 304 to collectively convey the tool string 308 downhole at the target speed, to the target depth, and while maintaining the target line tension (e.g., as collectively measured downhole). The control commands output by the processing device 314 may be indicative of operational parameters of surface equipment 302, such as the flow rate of the fluid pumped into the wellbore 102 by the pump unit 306 and the speed at which the conveyance device 304 unwinds the conveyance line 120 to convey the tool string 308 within the wellbore 102, which collectively cause or otherwise result in the target operational parameters to be achieved downhole at the tool string 308. For example, the output control commands may be indicative of rotational speed of the rotary actuator 164 to control the fluid flow rate generated by the pump 166. The output control commands may be indicative of rotational speed of the rotary actuator 136 to control the rotational speed of the drum 134, and thus the conveyance speed of the tool string 308. The processing device 314 may also or instead automatically and in real-time select, choose, or otherwise determine the target values of operational parameters (e.g., rotational speed, fluid flow rate) of the conveyance device 304 and/or the fluid pump unit 306 to achieve optimum (e.g., maximum) operational parameters (e.g., speed, efficiency, safety, etc.) at which the tool string 308 moves along the wellbore 102.

The processing device 314 may be or comprise a controller operable to receive information, process the information, and output control commands based on the received and/or processed information. For example, the processing device 314 may comprise a proportional, integral, and derivative (PID) controller, utilizing negative feedback control gain to achieve the target values of operational parameters. The processing device 314 may operate to achieve the target tool string speed by controlling the rotational speed of the drum 134 of the conveyance device 304. In such implementations, the negative feedback may comprise the speed of the tool string 308 measured at the surface 104, such as by determining rotational speed of the drum 134. The negative feedback may also or instead comprise the speed of the tool string 308 measured downhole, which may be determined based on a position signal generated by a downhole tool 114 (e.g., the INS system). In another example implementation, the processing device 314 may operate to achieve a target downhole conveyance line tension by controlling the fluid flow rate generated by the fluid pump unit 306 and/or the rotational speed of the drum 134 of the conveyance device 304. In such implementation, the negative feedback may comprise conveyance line tension measured downhole, which may be determined based on a tension signal generated by a downhole tension sensor (e.g., a load cell).

The processing device 314 may cause the conveyance device 304 to unwind the conveyance line 120 and the fluid pump unit 306 to pump a fluid into the wellbore 102 such that the tool string 308 moves along different portions (e.g., vertical, horizontal, deviated, crooked, etc.) of the wellbore 102 as intended. The processing device 314 may cause the conveyance device 304 to unwind the conveyance line 120 and the fluid pump unit 306 to pump the fluid into the wellbore 102 such that the fluid pumped by the fluid pump unit 306 moves the tool string 308 along the wellbore 102. The processing device 314 may cause the fluid pump unit 306 to vary the flow rate of the fluid being pumped into the wellbore 102 and/or cause the conveyance device 304 to vary rate at which the conveyance line 120 is unwound to vary the tension that the conveyance line 120 applies to the tool string 308 and/or vary the speed at which the tool string 308 moves along the wellbore 102. The processing device 314 may cause the conveyance device 304 to unwind the conveyance line 120 and the fluid pump unit 306 to pump the fluid into the wellbore 102 such that the tool string 308 moves along the wellbore 102 at the target speed and/or the conveyance line 120 applies the target tension to the tool string 308. For example, the processing device 314 may cause the conveyance device 304 to unwind the conveyance line 120 and the fluid pump unit 306 to pump the fluid into the wellbore 102 such that the tool string 308 moves along the wellbore 102 at a substantially constant speed and/or the conveyance line 120 applies a substantially constant tension to the tool string 308.

The processing device 314 may cause the fluid pump unit 306 to vary the flow rate of the fluid being pumped into the wellbore 102 and/or cause the conveyance device 304 to vary rate at which the conveyance line 120 is unwound based on speed and/or tension measured by a downhole tool 114 and/or based on changing downhole conditions (e.g., depth, diameter, orientation, friction coefficient, etc.). The processing device 314 may select or determine a speed (e.g., an optimal, maximum, and/or most efficient speed) at which the tool string 308 is to be conveyed along the wellbore 102, and then cause the conveyance device 304 to unwind the conveyance line 120 and the fluid pump unit 306 to pump the fluid into the wellbore 102, such that the tool string 308 moves along the wellbore 102 at the determined speed. The processing device 314 may select or determine a tension (e.g., an optimal, maximum, and/or most efficient tension) that the conveyance line 120 is to apply to the tool string 308 while the tool string 308 is conveyed along the wellbore 102, and then cause the conveyance device 304 to unwind the conveyance line 120 and the fluid pump unit 306 to pump the fluid into the wellbore 102, such that the conveyance line 120 applies the determined tension to the tool string 308.

The processing device 314 may automatically cause the conveyance device 304 to unwind the conveyance line 120 and the fluid pump unit 306 to pump a fluid into the wellbore 102 such that the tool string 308 moves along the horizontal or otherwise deviated portion of the wellbore 102 without sticking to a sidewall of the wellbore 102. The processing device 314 may coordinate operations of the fluid pump unit 306 and the conveyance device 304 such that the tool string 308 is conveyed along the wellbore 102 in a substantially smooth, continuous (i.e., non-stop), or other manner, thereby preventing or inhibiting the stick-slip and pump-off events from taking place. The processing device 314 may automatically adjust or change the output control commands to adjust or change the operational parameters of the fluid pump unit 306 and the conveyance device 304 if the processing device 314 detects stick-slip events or if the downhole line tension is measured to be above the target line tension or above a predetermined threshold above which the conveyance line 120 can separate from the tool string 308. The processing device 314 may vary operational parameters of the fluid pump unit 306 and the conveyance device 304 in a coordinated manner, such that the target values of downhole and/or surface operational parameters (e.g., ones chosen by the wellsite operator 315 or by the processing device 315) of the tool string 308 are reestablished and maintained. If such target values of operational parameters are not achievable based on the surface and/or downhole measured operational parameters and the physical properties of the wellsite system 300, the processing device 314 may automatically and in real-time adjust the target operational parameters to values that are achievable under present surface and/or downhole conditions.

Figure 8:
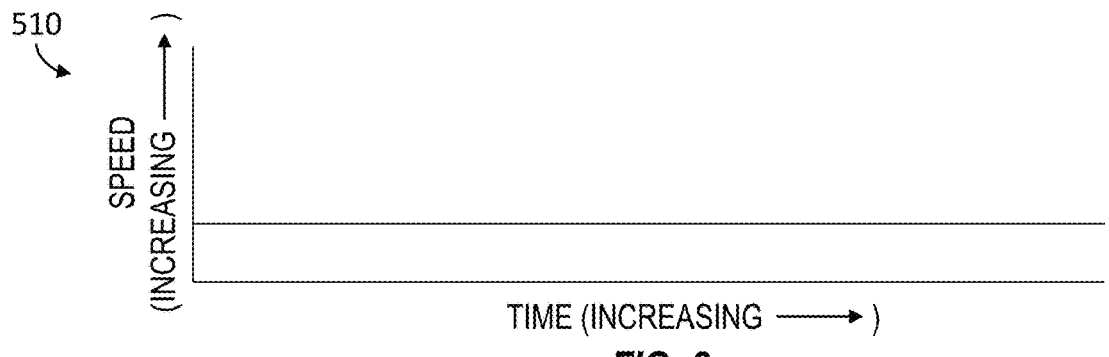
FIGS. 8-11 are graphs related to one or more aspects of the present disclosure.
Figure 9:
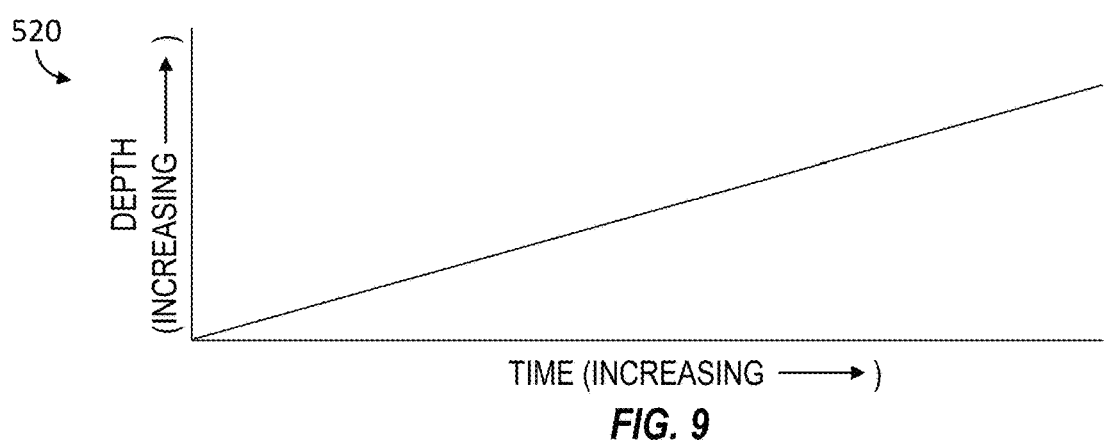
Figure 10:
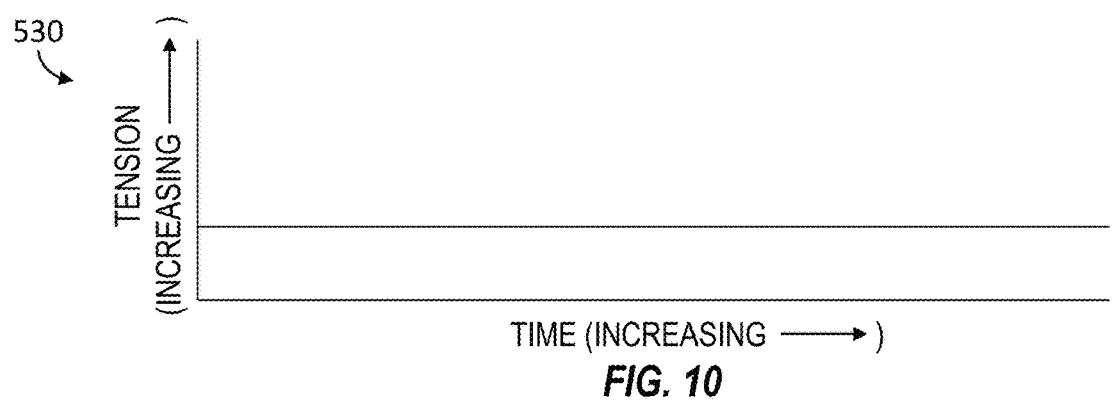
Figure 11:
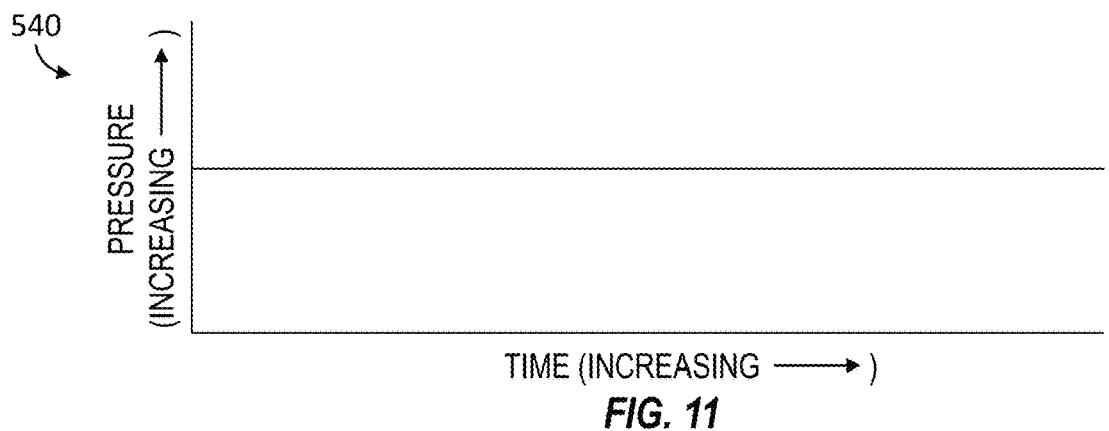

FIGS. 8-11 are graphs showing example operational parameters measured downhole during pump-down operations performed by the wellsite system 300 shown in FIG. 6 while the processing device 314 is automatically and in real-time coordinating operations of the fluid pump unit 306 and the conveyance device 304. FIG. 8 is a graph 510 showing downhole speed at which the tool string 308 moves downhole along the wellbore 102 with respect to time. The graph 510 shows the tool string 308 moving along the wellbore 308 at a constant speed, such as a target speed entered into the processing device 314 or an optimal speed selected (i.e., determined) by the processing device 314, and is not experiencing accelerations or decelerations. FIG. 9 is a graph 520 showing downhole depth of the tool string 308 within the wellbore 102 with respect to time. The graph 520 shows the depth of tool string 308 is increasing at a constant rate, and is not experiencing accelerations or decelerations. FIG. 10 is a graph 530 of downhole tension of the conveyance line 120 at the tool string 308 (e.g., the cable head 112, the sensor tool 114) with respect to time. The graph 530 shows a constant tension applied to the tool string 308, such as a target tension entered into the processing device 314 or an optimal tension selected by the processing device 314. FIG. 11 is a graph 540 showing downhole fluid pressure at the tool string 308 with respect to time. The graph 540 shows that the fluid pressure above (or behind) the tool string 308 is maintained at a constant level, which may be at least partially caused by the constant speed of the tool string 308.

As described herein, the processing device 314 may coordinate operations of the fluid pump unit 306 and the conveyance device 304 such that the tool string 308 moves along the wellbore 102 at the target speed to the target depth, while maintaining the target line tension and, thereby, preventing, inhibiting, or reducing occurrence of pump-off and stick-slip. It is to be understood that graphs 510, 520, 530, 540 show theoretical (e.g., ideal) profiles of measurements of the downhole speed, depth, tension, and fluid pressure with respect to time. Although the graphs 510, 520, 530, 540 show perfectly constant speed, depth, tension, and pressure measurements, it is to be understood that actual measurements may not be perfectly constant, but may be substantially constant, varying or fluctuating with respect to the target measurements. For example, the actual downhole (and/or surface) speed, depth, tension, and/or fluid pressure measurements may vary or fluctuate with respect to the target speed, depth, tension, and/or fluid pressure measurements by about +/−0.5%, +/−1%, +/−2%, +/−3%, +/−5%, +/−7.5%, +/−10%, +/−15%, +/−20%, and +/−25%, or more.

Figure 12:
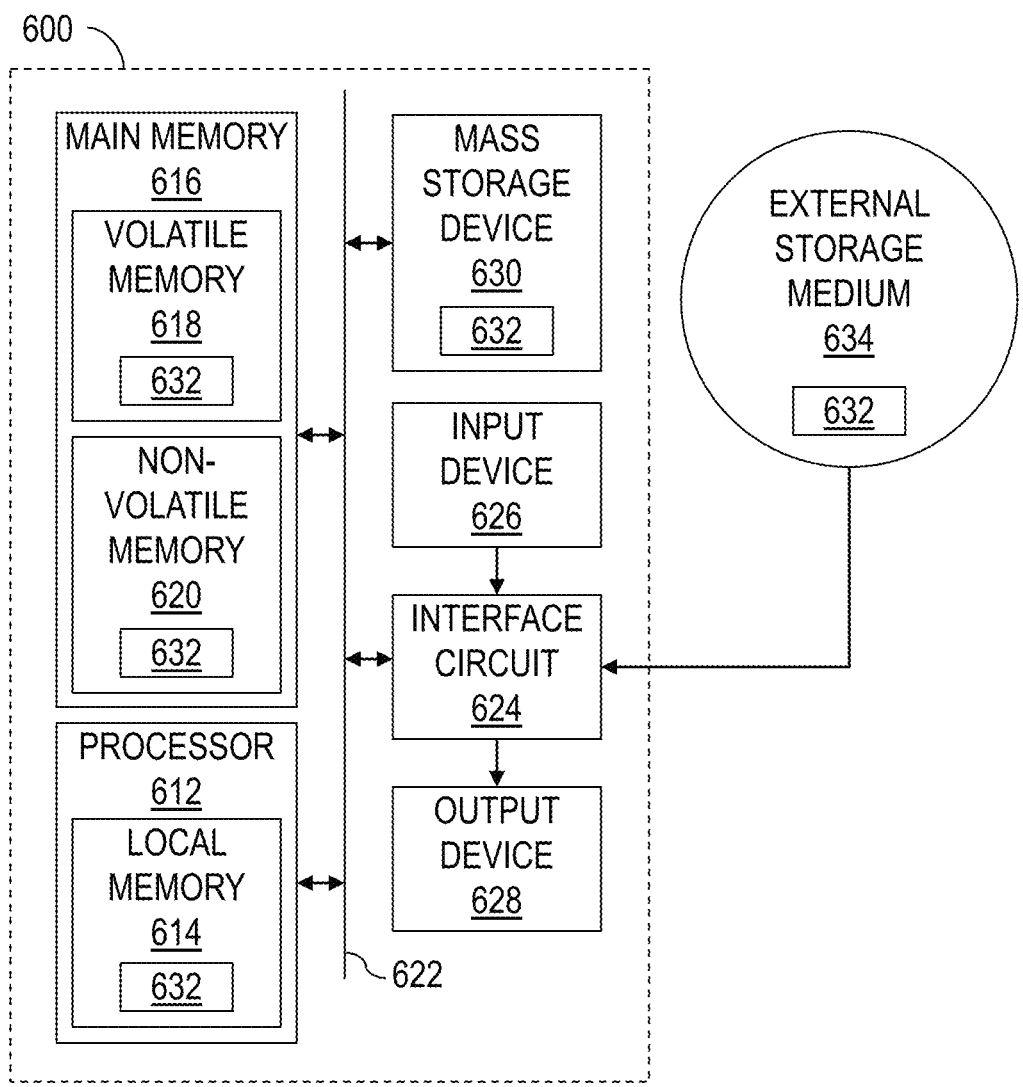
FIG. 12 is a schematic view of at least a portion of an example implementation of apparatus according to one or more aspects of the present disclosure.

FIG. 12 is a schematic view of at least a portion of an example implementation of a processing device 600 (or system) according to one or more aspects of the present disclosure. The processing device 600 may be or form at least a portion of one or more electronic devices shown in one or more of FIGS. 6 and 7. Accordingly, the following description refers to FIGS. 6, 7, and 12, collectively.

The processing device 600 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 600 may be or form at least a portion of the processing device 314 and/or downhole tools 114. Although it is possible that the entirety of the processing device 600 is implemented within one device, it is also contemplated that one or more components or functions of the processing device 600 may be implemented across multiple devices, some or an entirety of which may be at the wellsite and/or remote from the wellsite.

The processing device 600 may comprise a processor 612, such as a general-purpose programmable processor. The processor 612 may comprise a local memory 614, and may execute machine-readable and executable program code instructions 632 (i.e., computer program code) present in the local memory 614 and/or another memory device. The processor 612 may execute, among other things, the program code instructions 632 and/or other instructions and/or programs to implement the example methods and/or operations described herein. For example, the program code instructions 632, when executed by the processor 612 of the processing device 600, may cause the processor 612 to receive and process (e.g., compare) sensor data (e.g., sensor measurements) and output information indicative of operational and/or environmental parameters according to one or more aspects of the present disclosure. The program code instructions 632, when executed by the processor 612 of the processing device 600, may also or instead cause one or more portions or pieces of equipment of the wellsite system 300 to perform the example methods and/or operations described herein. The processor 612 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 612 include one or more INTEL microprocessors, microcontrollers from the ARM, PIC, and/or PICO families of microcontrollers, embedded soft/hard processors in one or more FPGAs.

The processor 612 may be in communication with a main memory 616, such as may include a volatile memory 618 and a non-volatile memory 620, perhaps via a bus 622 and/or other communication means. The volatile memory 618 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 620 may be, comprise, or be implemented by read-only memory, flash memory, and/or other types of memory devices. One or more memory controllers (not shown) may control access to the volatile memory 618 and/or non-volatile memory 620.

The processing device 600 may also comprise an interface circuit 624, which is in communication with the processor 612, such as via the bus 622. The interface circuit 624 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 624 may comprise a graphics driver card. The interface circuit 624 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 600 may be in communication with various sensors, actuators, processing devices, equipment controllers, and other devices of the wellsite system 300 via the interface circuit 624. The interface circuit 624 can facilitate communications between the processing device 600 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 626 may also be connected to the interface circuit 624. The input devices 626 may permit human wellsite operators to enter the program code instructions 632, which may be or comprise control commands, operational parameters, physical properties, and/or operational set-points. The program code instructions 632 may further comprise modeling or predictive routines, equations, algorithms, processes, applications, and/or other programs operable to perform example methods and/or operations described herein. The input devices 626 may be, comprise, or be implemented by a keyboard, a mouse, a joystick, a touchscreen, a track-pad, a trackball, an isopoint, and/or a voice recognition system, among other examples. One or more output devices 628 may also be connected to the interface circuit 624. The output devices 628 may permit for visualization or other sensory perception of various data, such as sensor data, status data, and/or other example data. The output devices 628 may be, comprise, or be implemented by video output devices (e.g., an LCD, an LED display, a CRT display, a touchscreen, etc.), printers, and/or speakers, among other examples. The one or more input devices 626 and the one or more output devices 628 connected to the interface circuit 624 may, at least in part, facilitate the HMI devices described herein.

The processing device 600 may comprise a mass storage device 630 for storing data and program code instructions 632. The mass storage device 630 may be connected to the processor 612, such as via the bus 622. The mass storage device 630 may be or comprise a tangible, non-transitory storage medium, such as a floppy disk drive, a hard disk drive, a compact disk (CD) drive, and/or digital versatile disk (DVD) drive, among other examples. The processing device 600 may be communicatively connected with an external storage medium 634 via the interface circuit 624. The external storage medium 634 may be or comprise a removable storage medium (e.g., a CD or DVD), such as may be operable to store data and program code instructions 632.

As described above, the program code instructions 632 may be stored in the mass storage device 630, the main memory 616, the local memory 614, and/or the removable storage medium 634. Thus, the processing device 600 may be implemented in accordance with hardware (perhaps implemented in one or more chips including an integrated circuit, such as an ASIC), or may be implemented as software or firmware for execution by the processor 612. In the case of firmware or software, the implementation may be provided as a computer program product including a non-transitory, computer-readable medium or storage structure embodying computer program code instructions 632 (i.e., software or firmware) thereon for execution by the processor 612. The program code instructions 632 may include program instructions or computer program code that, when executed by the processor 612, may perform and/or cause performance of example methods, processes, and/or operations described herein.

In view of the entirety of the present disclosure, including the figures and the claims, a person having ordinary skill in the art will readily recognize that the present disclosure introduces an apparatus comprising a control system having a processor and a memory storing computer program code, wherein the control system is configured to be communicatively connected with a fluid pump disposed at a wellsite surface and with a conveyance device disposed at the wellsite surface, and wherein the control system is operable to: cause the conveyance device to unwind a conveyance line connected with a tool string disposed within a wellbore; and cause the fluid pump to pump a fluid into the wellbore such that the fluid moves the tool string along the wellbore while the conveyance device unwinds the conveyance line.

The control system may be further operable to cause the conveyance device to vary a rate at which the conveyance line is unwound to vary the speed at which the tool string moves along the wellbore.

The control system may be further operable to cause the conveyance line unwinding and the fluid pumping such that the tool string moves along the wellbore at an intended speed.

The control system may be further operable to cause the conveyance line unwinding and the fluid pumping such that the tool string moves along the wellbore at a substantially constant speed.

The control system may be further operable to determine a speed at which the tool string is to be conveyed along the wellbore, and to cause the conveyance line unwinding and the fluid pumping such that the tool string moves along the wellbore at the determined speed.

The control system may be further operable to cause the conveyance device to vary a rate at which the conveyance line is unwound to vary a tension that the conveyance line applies to the tool string.

The control system may be further operable to cause the fluid pump to vary a flow rate of the fluid pumped into the wellbore to vary tension that the conveyance line applies to the tool string.

The control system may be further operable to cause the conveyance line unwinding and/or the fluid pumping such that the conveyance line applies a substantially constant tension to the tool string.

The control system may be further operable to: determine tension that the conveyance line is to apply to the tool string while the tool string is conveyed along the wellbore; and cause the conveyance line unwinding and the fluid pumping such that the conveyance line applies the determined tension to the tool string.

The control system may be operable to cause the conveyance line unwinding and the fluid pumping such that the tool string moves along the wellbore at an intended speed and the conveyance line applies an intended tension to the tool string.

The control system may be operable to cause the conveyance line unwinding and the fluid pumping such that the tool string moves along the wellbore at a substantially constant speed and the conveyance line applies a substantially constant tension to the tool string.

The apparatus may further comprise a downhole tension sensor disposed in association with the tool string, the downhole tension sensor being operable to facilitate measurement of tension applied by the conveyance line to the tool string. The control system may be communicatively connected with the downhole tension sensor and may be operable to cause the conveyance line unwinding and the fluid pumping based on the measurement of tension.

The apparatus may further comprise a downhole position sensor disposed in association with the tool string, the downhole position sensor being operable to facilitate measurement of a speed at which the tool string moves along the wellbore. The control system may be communicatively connected with the downhole position sensor and operable to cause the conveyance line unwinding and the fluid pumping based on the measurement of speed.

The control system may be further operable to cause the conveyance line unwinding and the fluid pumping such that the tool string moves along the wellbore without sticking to a sidewall of the wellbore.

The control system may be further operable to cause the conveyance line unwinding and the fluid pumping such that tension applied by the conveyance line to the tool string remains below a predetermined threshold.

The control system may be further operable to cause the conveyance line unwinding and the fluid pumping such that the tool string moves along the wellbore without sticking to a sidewall of the wellbore and tension applied by the conveyance line to the tool string remains below a predetermined threshold.

In response to the tool string sticking to a sidewall of the wellbore, the control system may be operable to cause the conveyance device to vary a rate at which the conveyance line is unwound.

In response to the tool string sticking to a sidewall of the wellbore, the control system may be operable to cause the fluid pump to vary a flow rate of the fluid being pumped into the wellbore.

In response to tension applied by the conveyance line to the tool string exceeding a predetermined threshold, the control system may be operable to cause the conveyance device to vary a rate at which the conveyance line is unwound.

In response to tension applied by the conveyance line to the tool string exceeding a predetermined threshold, the control system may be operable to cause the fluid pump to vary a flow rate of the fluid being pumped into the wellbore.

The apparatus may further comprise a wellsite system comprising: the fluid pump fluidly connected with the wellbore; the conveyance device; the tool string; and the conveyance line connected with the conveyance device and the tool string.

The present disclosure also introduces a method comprising commencing operation of a control system for controlling a fluid pump disposed at a wellsite surface and a conveyance device disposed at the wellsite surface. Operation of the control system: causes the conveyance device to unwind a conveyance line connected with a tool string disposed within a wellbore; and causes the fluid pump to pump a fluid into the wellbore such that the fluid moves the tool string along the wellbore while the conveyance device unwinds the conveyance line.

Operation of the control system may cause the conveyance device to vary a rate at which the conveyance line is unwound to, thereby, vary a speed at which the tool string moves along the wellbore.

Operation of the control system may cause the conveyance device to vary a rate at which the conveyance line is unwound to, thereby, vary tension that the conveyance line applies to the tool string.

Operation of the control system may cause the conveyance line unwinding and the fluid pumping such that the tool string moves along the wellbore at an intended speed and the conveyance line applies an intended tension to the tool string.

Operation of the control system may cause the conveyance line unwinding and the fluid pumping such that: the tool string moves along the wellbore without sticking to a sidewall of the wellbore; and/or tension applied by the conveyance line to the tool string remains below a predetermined threshold.

In response to either the tool string sticking to a sidewall of the wellbore or tension applied by the conveyance line to the tool string exceeding a predetermined threshold, operation of the control system may: cause the conveyance device to vary a rate at which the conveyance line is unwound; and/or cause the fluid pump to vary a flow rate of the fluid being pumped into the wellbore.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

What is claimed is:

1. A wellsite system comprising:
   a control workstation;
   a fluid pump unit comprising a first rotary actuator and first sensors, wherein the first sensors generate data indicative of surface fluid flow rate, surface fluid pressure, and surface fluid temperature;
   a conveyance device comprising a conveyance line, a second rotary actuator, and second sensors, wherein the second sensors generate data indicative of surface depth of a tool string within a wellbore, surface conveyance speed of the tool string within the wellbore, and surface line tension of the conveyance line;
   the tool string conveyed and comprising third sensors generate data indicative of downhole operational parameters of the tool string and environmental parameters affecting the tool string within the wellbore, wherein the third sensors include:
      a downhole tension sensor generating data indicative of tension experienced by the tool string;
      a temperature sensor generating data indicative of ambient temperature of fluid surrounding the tool string within the wellbore;
      a pressure sensor generating data indicative of downhole pressure of the fluid surrounding the tool string within the wellbore;
      a depth sensor generating data indicative of depth of the tool string within the wellbore; and
      a speed sensor generating data indicative of downhole conveyance speed of the tool string within the wellbore; and
   a processing device communicatively connected with the first and second rotary actuators, the conveyance device, the tool string, and the first, second, and third sensors, wherein the processing device:
      receives target values of operational parameters entered into the processing device by a wellsite operator via the control workstation, wherein the target values include:
         a target depth of the tool string within the wellbore;
         a target conveyance speed of the tool string within the wellbore;
         a target fluid flow rate output by the fluid pump unit into the wellbore;
         a target conveyance line tension; and
         a maximum conveyance line tension threshold;
      receives physical characteristics of the wellsite system entered into the processing device by the wellsite operator via the control workstation, wherein the physical characteristics include:
         mass of the tool string;
         a coefficient of friction of the tool string against passing fluid;
         elasticity of the conveyance line;
         mass per unit length of the conveyance line;
         density of the fluid being pumped by the fluid pump unit;
         viscosity of the fluid being pumped by the fluid pump unit;
         physical parameters of the wellbore; and
         a coefficient of friction of a casing of the wellbore against the tool string and passing fluid; and
      controls conveyance of the tool string within the wellbore via cooperative control of the fluid pump unit and the conveyance device based on:
         each measurement from the first, second, and third sensors;
         each target value; and
         each physical characteristic of the wellsite system.

2. The wellsite system of claim 1 wherein the downhole tension sensor comprises a load cell.

3. The wellsite system of claim 1 wherein the target conveyance line tension is a target surface conveyance line tension.

4. The wellsite system of claim 1 wherein the target conveyance line tension is a target downhole conveyance line tension.

5. The wellsite system of claim 1 wherein the maximum conveyance line tension threshold is a maximum surface conveyance line tension threshold.

6. The wellsite system of claim 1 wherein the maximum conveyance line tension threshold is a maximum downhole conveyance line tension threshold.

7. The wellsite system of claim 1 wherein the target conveyance speed of the tool string is selected to automatically vary along different portions of the wellbore based on the physical parameters of the wellbore.

8. The wellsite system of claim 1 wherein the target conveyance line tension is a target surface conveyance line tension.

9. The wellsite system of claim 8 wherein the maximum conveyance line tension threshold is a maximum surface conveyance line tension threshold.

10. The wellsite system of claim 9 wherein the target conveyance speed of the tool string is selected to automatically vary along different portions of the wellbore based on the physical parameters of the wellbore.

11. The wellsite system of claim 1 wherein the target conveyance line tension is a target downhole conveyance line tension.

12. The wellsite system of claim 11 wherein the maximum conveyance line tension threshold is a maximum downhole conveyance line tension threshold.

13. The wellsite system of claim 12 wherein the target conveyance speed of the tool string is selected to automatically vary along different portions of the wellbore based on the physical parameters of the wellbore.

* * * * *